(12) United States Patent
Marshall et al.

(10) Patent No.: US 9,361,556 B1
(45) Date of Patent: *Jun. 7, 2016

(54) PULSE WIDTH MODULATOR FOR A PRINTING DEVICE

(71) Applicant: Marvell International Ltd., Hamilton (BM)

(72) Inventors: John D Marshall, Boise, ID (US);
Douglas Keithley, Boise, ID (US);
Richard Taylor, Eagle, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,822

(22) Filed: Jan. 30, 2015

Related U.S. Application Data

(63) Continuation of application No. 11/881,181, filed on Jul. 25, 2007, now Pat. No. 8,947,734.

(60) Provisional application No. 60/820,536, filed on Jul. 27, 2006.

(51) Int. Cl.
| | | |
|---|---|---|
| *G06K 15/02* | (2006.01) |
| *G06K 15/14* | (2006.01) |
| *G06F 3/12* | (2006.01) |
| *H04N 1/40* | (2006.01) |
| *B41J 2/455* | (2006.01) |
| *G06K 15/12* | (2006.01) |

(52) U.S. Cl.
CPC ............ *G06K 15/1873* (2013.01); *G06K 15/12* (2013.01); *G06K 15/1894* (2013.01)

(58) Field of Classification Search
None
See application file for complete search history.

(56) References Cited

U.S. PATENT DOCUMENTS

| | | | |
|---|---|---|---|
| 4,279,002 A * | 7/1981 | Rider | 358/409 |
| 4,760,406 A | 7/1988 | Sato | |
| 4,809,216 A * | 2/1989 | Lai | 358/1.17 |
| 4,893,136 A | 1/1990 | Curry | |
| 5,008,685 A | 4/1991 | Arai | |
| 5,229,760 A | 7/1993 | Curry | |
| 5,355,154 A | 10/1994 | Guerin | |
| 5,432,536 A | 7/1995 | Takada et al. | |
| 5,477,179 A | 12/1995 | Takada et al. | |
| 5,489,936 A | 2/1996 | Appel et al. | |
| 5,742,317 A | 4/1998 | Kashihara | |
| 5,798,720 A | 8/1998 | Yano | |
| 5,930,404 A | 7/1999 | Hattori | |
| 6,027,197 A * | 2/2000 | Kaburagi et al. | 347/9 |
| 6,570,672 B1 | 5/2003 | Hattori | |
| 6,680,782 B1 * | 1/2004 | Jamzadeh | 358/1.14 |

(Continued)

FOREIGN PATENT DOCUMENTS

| | | |
|---|---|---|
| JP | 2000/238342 | 9/2000 |
| JP | 2003/039733 | 2/2003 |

*Primary Examiner* — Beniyam Menberu

(57) ABSTRACT

A pulse width modulation technique is disclosed for use in an image forming device such as a laser printer or a photocopier. The technique implements a pacer to synthesize the frequency of a serializer circuit by stretching (or shrinking) pixel pulse train data. The pacer stretches the pixel pulse train data in accord with increment data that is based upon information about the image forming device, such as the number of bits in the pixel pulse train data, the number of bits in print engine pulse train, the target print engine frequency, and the serializer frequency. The technique can be implemented with digital circuits that provide digital test data.

20 Claims, 6 Drawing Sheets

(56) References Cited

U.S. PATENT DOCUMENTS

| | | |
|---|---|---|
| 6,882,443 B1 | 4/2005 | McDonald |
| 6,958,765 B2 | 10/2005 | Hane |
| 7,253,754 B2 * | 8/2007 | Takeuchi et al. ............. 341/100 |
| 8,947,734 B1 * | 2/2015 | Marshall et al. ............. 358/3.02 |
| 2001/0016929 A1 | 8/2001 | Bonneau et al. |
| 2002/0051026 A1 * | 5/2002 | Shoji et al. ..................... 347/16 |
| 2003/0151434 A1 * | 8/2003 | Hane ............................. 327/172 |
| 2003/0209660 A1 * | 11/2003 | Kanno .......................... 250/236 |
| 2005/0076280 A1 * | 4/2005 | Martinez ....................... 714/733 |
| 2005/0157159 A1 | 7/2005 | Komiya et al. |
| 2005/0158062 A1 | 7/2005 | Yamada et al. |
| 2005/0212905 A1 | 9/2005 | Clarke et al. |
| 2005/0219620 A1 | 10/2005 | Ohshita |
| 2006/0203077 A1 | 9/2006 | Komiya et al. |
| 2006/0285186 A1 * | 12/2006 | Ishida et al. .................. 359/204 |
| 2007/0285686 A1 * | 12/2007 | Honda .......................... 358/1.9 |

* cited by examiner

| 306 bit positions | clock cycle 0 | 1 | 2 | 3 | 4 | 5 | 6 | 7 |
|---|---|---|---|---|---|---|---|---|
| 0 | 0 | 4.5056 | 9.0112 | 13.5168 | 18.0223999 | 22.528 | 27.0336 | 31.5392 |
| 1 | 0.281599 | 4.787199 | 9.292799 | 13.7984 | 18.30399895 | 22.8096 | 27.3152 | 31.8208 |
| 2 | 0.5632 | 5.0688 | 9.5744 | 14.08 | 18.5855999 | 23.0912 | 27.5968 | 32.1024 |
| 3 | 0.844799 | 5.350399 | 9.855999 | 14.3616 | 18.86719894 | 23.3728 | 27.8784 | 32.383999 |
| 4 | 1.1264 | 5.632 | 10.1376 | 14.6432 | 19.1487999 | 23.6544 | 28.16 | 32.6656 |
| 5 | 1.407999 | 5.913599 | 10.4192 | 14.9248 | 19.43039894 | 23.936 | 28.4416 | 32.947199 |
| 6 | 1.6896 | 6.1952 | 10.7008 | 15.2064 | 19.71199989 | 24.2176 | 28.7232 | 33.2288 |
| 7 | 1.971201 | 6.476801 | 10.9824 | 15.488 | 19.99360085 | 24.4992 | 29.0048 | 33.510401 |
| 8 | 2.2528 | 6.7584 | 11.264 | 15.7696 | 20.275199989 | 24.7808 | 29.2864 | 33.792 |
| 9 | 2.534399 | 7.039999 | 11.5456 | 16.0512 | 20.55679893 | 25.0624 | 29.568 | 34.073599 |
| 10 | 2.816 | 7.3216 | 11.8272 | 16.3328 | 20.83839989 | 25.344 | 29.8496 | 34.3552 |
| 11 | 3.097601 | 7.603201 | 12.1088 | 16.6144 | 21.12000086 | 25.6256 | 30.1312 | 34.636801 |
| 12 | 3.3792 | 7.8848 | 12.3904 | 16.896 | 21.40159991 | 25.9072 | 30.4128 | 34.9184 |
| 13 | 3.660801 | 8.166401 | 12.672 | 17.1776 | 21.68320086 | 26.1888 | 30.6944 | 35.200001 |
| 14 | 3.9424 | 8.448 | 12.9536 | 17.4592 | 21.96479991 | 26.4704 | 30.976 | 35.4816 |
| 15 | 4.224001 | 8.729601 | 13.2352 | 17.7408 | 22.24640086 | 26.752 | 31.2576 | 35.763201 |

Print engine Pulse train 304 clock cycle

//PULSE WIDTH MODULATOR FOR A PRINTING DEVICE

CROSS-REFERENCE TO RELATED APPLICATIONS

This application is a continuation of U.S. application Ser. No. 11/881,181 (now U.S. Pat. No. 8,947,734), which claims the benefit of U.S. Provisional Application No. 60/820,536, filed Jul. 27, 2006, each of which is hereby incorporated herein by reference in their entirety.

FIELD OF THE DISCLOSURE

The present disclosure is related to the field of image forming More particularly, a technique is disclosed for generating a video signal based upon a target print engine frequency for an image forming device. The disclosure also relates to testability aspects of high-speed circuits configured to generate video signals.

BACKGROUND

Image forming devices such as laser printers and photocopiers typically include at least one pulse width modulator (PWM) for generating video signals. A video signal comprises a succession of various width pulses derived from image data, such as a bitmap. The video signal is received by a print engine and controls the application of light or other type of beam to areas on a charged drum. The light discharges the areas to which it is applied. The drum is then coated with toner, which clings to the discharged areas. A media, such as a sheet of paper, is then exposed to the toner on the drum and the image is thereby formed on the media.

The quality of a printed image is highly dependent upon the accuracy of the PWM and its capacity to time the pulses with precision. Pulse timing is based upon the image data and dependent upon the frequency of the print engine, i.e., the pace at which the light beam moves along a scan line, which may change from pixel-to-pixel.

An important consideration of PWM design is the relationship between the PWM frequency and the print engine frequency. More and more frequently, print engines are designed to operate at frequencies that are not evenly related to the PWM clock. In addition, the frequency of the print engine may change pixel-to-pixel, further complicating the PWM design.

The testability of PWM circuits in imaging devices is complicated due to their high operational speed, which may reach into the GHz range. Also, PWMs utilize analog circuitry, in addition to digital circuitry, to achieve the goal of fine pulse placement at the frequency of the print engine. It is difficult to test analog circuits and/or high frequency circuits because such testing requires measurements at precise moments, oftentimes defined by only a few picoseconds.

Thus, it would be desirable to provide an improved digital PWM technique for use in an image forming device.

SUMMARY

The present invention is defined by the claims and nothing in this section should be taken as a limitation on those claims.

A technique is disclosed to generate a video signal conformed to a target print engine frequency for an image forming device.

In one version, a pixel pulse train is generated from pixel data. Portions of the pixel pulse train are stretched into a plurality of print engine pulse trains. Each print engine pulse train is derived from a subgroup of bits in the pixel pulse train. Each subgroup of bits selected for stretching is based upon increment value data. The increment value data is based upon one or more image forming device specifications and a target print engine frequency. The image forming device specifications may include the frequency of the serializer, the number of bits in the pixel pulse train, and the number of bits in the print engine pulse train. The print engine pulse train is serialized to provide the video signal.

Stretching portions of the pixel pulse train provides additional bits for consumption by the serializer so that a pixel is drawn the correct distance from the start of the scan line. In another version, pixel pulse train data is shrunk so that a pixel is drawn the correct distance from the start of the scan line.

A preferred version of an image forming device that implements the technique also includes a sampler circuit, a sync generator circuit, a built-in-self-test circuit, and a synthetic beam detect circuit. The sampler circuit and the sync generator circuit are configured to provide a synchronized beam detect signal in response to a start of line signal from the print engine. The sampler circuit and the sync generator circuit translate the timing of the beam detect signal from the serializer frequency to the pacer frequency. The built-in-self-test circuit is configured to output print engine pulse train test data to the serializer, receive serialized test data from the sampler, and provide test result signals. The synthetic beam detect circuit generates a beam detect signal in the absence of a start of line signal.

The preferred embodiments will now be described with reference to the attached drawings.

BRIEF DESCRIPTION OF THE DRAWINGS

FIG. 3(*b*) shows the tap number data of FIG. 3(*a*) having the decimal places truncated.

DETAILED DESCRIPTION OF THE PRESENTLY PREFERRED EMBODIMENTS

Figure 1:
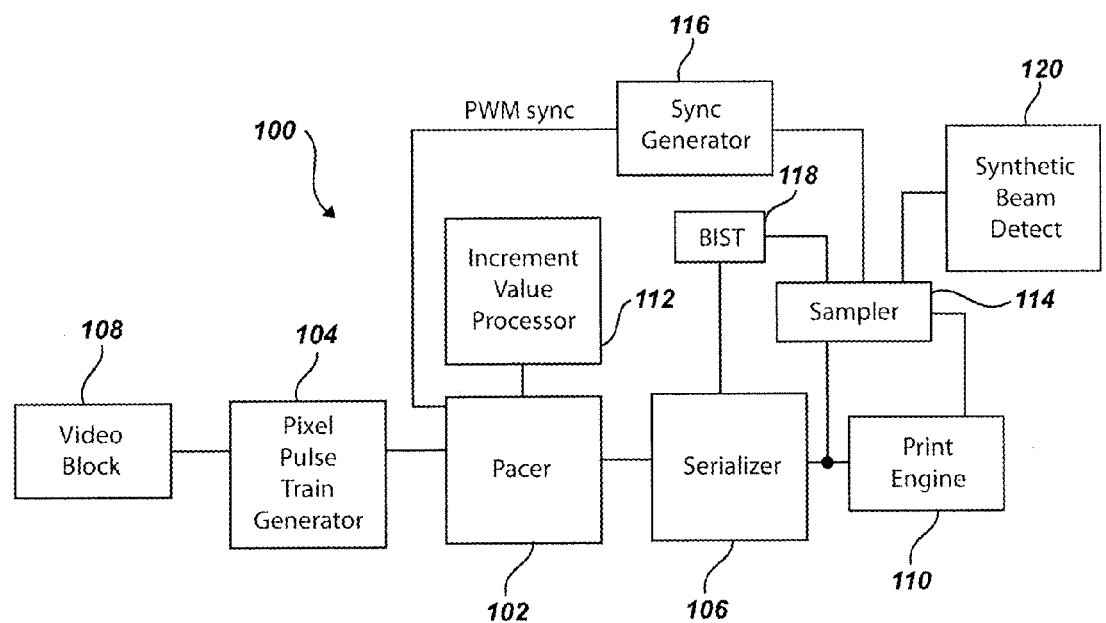
FIG. 1 is a block diagram of an image forming system implementing a version of a frequency synthesis technique of the invention.

FIG. 1 is a block diagram of an image forming system 100 having a pacer 102 in communication with a pixel pulse train generator 104 and a serializer 106. The pixel pulse train generator 104 is configured to receive pixel data from a video block 108 and generate pixel pulse train data. The pixel data represents toner placement information for a pixel. As an example, pixel data for a pixel may have eight bits wherein six bits represent toner width and two bits represent toner justification. More specifically, a 50%, right justified pulse code may be represented by pixel data such as "01100000", wherein the first two bits "01" indicate right justified and the last six bits "100000" indicate 50%.

Pixel pulse train data comprises a fixed number of bits, typically 32 or 64 bits, although other bit lengths are contemplated, wherein the status of each bit represents a desired "on" or "off" state of the print engine video signal. For example, a 32-bit pulse train for a 50%, right justified pixel may be (LSB to MSB):

11111111111111110000000000000000

The pacer 102 is configured to receive the pixel pulse train data and provide frequency synthesis between the fixed frequency of the serializer 106 and the frequency of the print engine 110. In other words, the pacer 102 is configured to receive data about a pixel and provide modified data (referred to hereinafter as a "print engine pulse train") configured to the pace/frequency at which the print engine 110 traverses each pixel.

In one version, an increment value processor 112 is configured to provide increment value data for use in stretching or shrinking the pixel pulse train data. The extent to which the pixel pulse train data is stretched or shrunk is based upon the increment value data. Note that an example of stretching the pixel pulse train data is discussed below with respect to the embodiments, although the increment value processor 112 can be configured to shrink the pixel pulse train data using the same embodiments.

The increment value data includes an increment step value and tap numbers. The increment step value identifies a bit range to be stretched (or shrunk) per clock cycle. In one version of the image forming system 100 the increment value processor 112 is configured to implement the following equation to calculate the increment step value:

$$\text{increment step value} = (b\_ppp) \cdot (b\_pept) \cdot (f\_pe)/f\_s$$

where,
$b\_ppp$=number of bits in pixel pulse train
$b\_pept$=number of bits in print engine pulse train
$f\_pe$=target print engine frequency
$f\_s$=serializer frequency increment step value ($I\_S\_V$)        Equation 1:

The tap numbers refer to the bit positions within the pixel pulse train data from which the pacer 102 receives the bit status to be given to each bit in the print engine pulse train.

The pacer 102 is configured to receive each tap number and retrieve the status of each bit at each tap number position in the 32-bit pixel pulse train. To stretch the data, multiple bits in the print engine pulse train will have the same tap number. The pacer 102 constructs the print engine pulse train from the bits retrieved in the 32-bit pixel pulse train at the tap number positions. For example, the pacer 102 may stretch the first four bits in the following 32-bit pixel pulse train to 16 bits in a print engine pulse train.

| Pixel pulse train: | bit number | 0 1 2 3 4 5 6 7 8 9 10 11 ... 31 |
|---|---|---|
| | bit status | 1 1 0 0 0 0 0 0 0 0 0 0 ... 0 |
| bit number from pixel pulse train | | 0 0 0 0 1 1 1 1 2 2 2 2 3 3 3 3 |
| Print engine pulse train: | | 1 1 1 1 1 1 1 1 0 0 0 0 0 0 0 0 |

In this example, four bits from the pixel pulse train are stretched to 16 bits in the print engine pulse train. Additional print engine pulse trains will be based upon the other bits (possibly including bit 3) in the pixel pulse train until the entire pixel pulse train is represented by a plurality of print engine pulse trains. The extent to which a pixel pulse train bit is stretched is dependent upon the variables in Equation 1.

The serializer 106 is configured to receive the print engine pulse train from the pacer 102 and serially output the print engine pulse train data for receipt and processing by the print engine 116. Stretching portions of the pixel pulse train provides additional bits for consumption by the serializer 106 so that the print engine 110 draws a pixel at a correct distance from the start of the scan line. Precise stretching provides frequency synthesis with the print engine 110 so the pixels are drawn at a precise distance from the start of the scan line. In another version, pixel pulse train data is shrunk so that a pixel is drawn at a precise distance from the start of the scan line.

Figure 2:
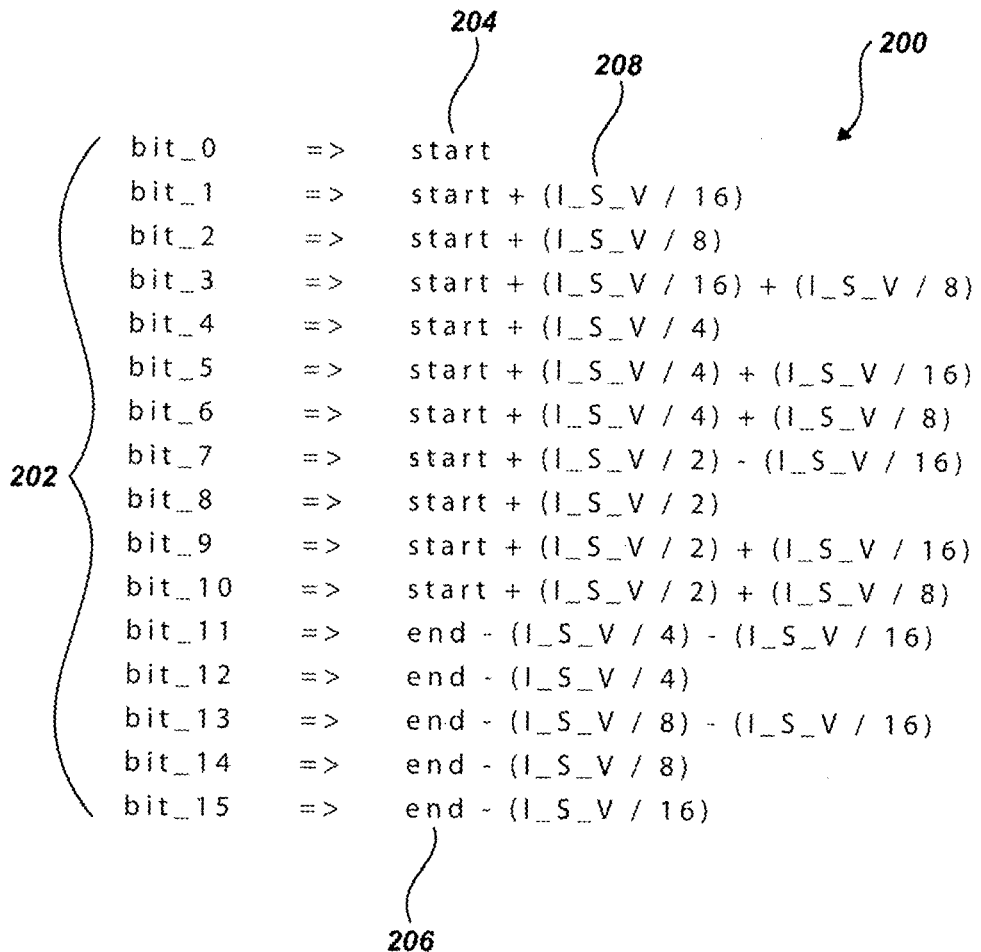
FIG. 2 shows a set of formulas for providing tap numbers that correlate bits in a print engine pulse train to bits in a pixel pulse train.

FIG. 2 shows a set of preferred formulas 200 that are implemented in a version of the increment value processor 112 for providing the tap numbers. Each formula provides, for each bit in the 16-bit print engine pulse train (bit_0, bit_1, bit_2 . . . ) 202, a tap number that refers to a position in the 32-bit print engine pulse train. The tap numbers may be derived by other formulas as well. For example, each tap number may be derived by a general formula:

$$\text{bit}\_(n) \Rightarrow \text{start} + (n \cdot I\_S\_V)/16$$

increment step value ($I\_S\_V$)        Equation 2

In the present embodiment (32-bit pixel pulse train), each tap number will be an integer number in the range of 0 to 63. Tap numbers in the range of 0 to 31 represent the current 32-bit pixel pulse train and those in the range of 32 to 63 represent the next 32-bit pixel pulse train. In other embodiments, the pixel pulse train may be of another length. For example, in an embodiment implementing a 64-bit pixel pulse train, each tap number may be an integer in the range of 0 to 127, wherein tap numbers in the range of 0 to 63 represent the current pixel pulse train, and those in the range of 64 to 127 represent the next pixel pulse train.

In one version, decimal places in a derived tap number are truncated to provide tap integers within the range of 0 to 31. The pacer 102 is configured to set the status of each bit in the 16-bit print engine pulse train to the status of the bit at a position equal to the tap integer in the 32-bit pixel pulse train.

The increment value processor 112 is configured to initially set the start value 204 to zero and the end value 206 to the increment step value 208 derived from Equation 1. At each clock cycle, an increment step value 208 is added to the start value 204 and the end value 206, respectively. The increment step value 208 may change at any time if one or more variables in Equation 1 change. For example, the target print engine frequency (f_pe) may change along a scan line. To account for the change, the increment step value 208 may be recalculated. In another version, the increment value processor 112 may be configured to account for changes by adding a predetermined slope value, which may be positive or negative, to the increment step value 208 at each clock cycle.

The increment step value(s) 208 and/or the slope value may be calculated by a processor such as a hardware or software processor, or retrieved from a memory device such as a configuration register or other storage device in communication with the increment value processor 112. The increment value processor 112 may be configured to add the slope value to the increment step value. In another version, a set of increment step values are stored, each based on a multiple of the slope value added to an initial increment step value. The set of increment step values may be stored in a memory device such as a configuration register or other storage device in communication with the increment value processor 112.

Figure 3B:
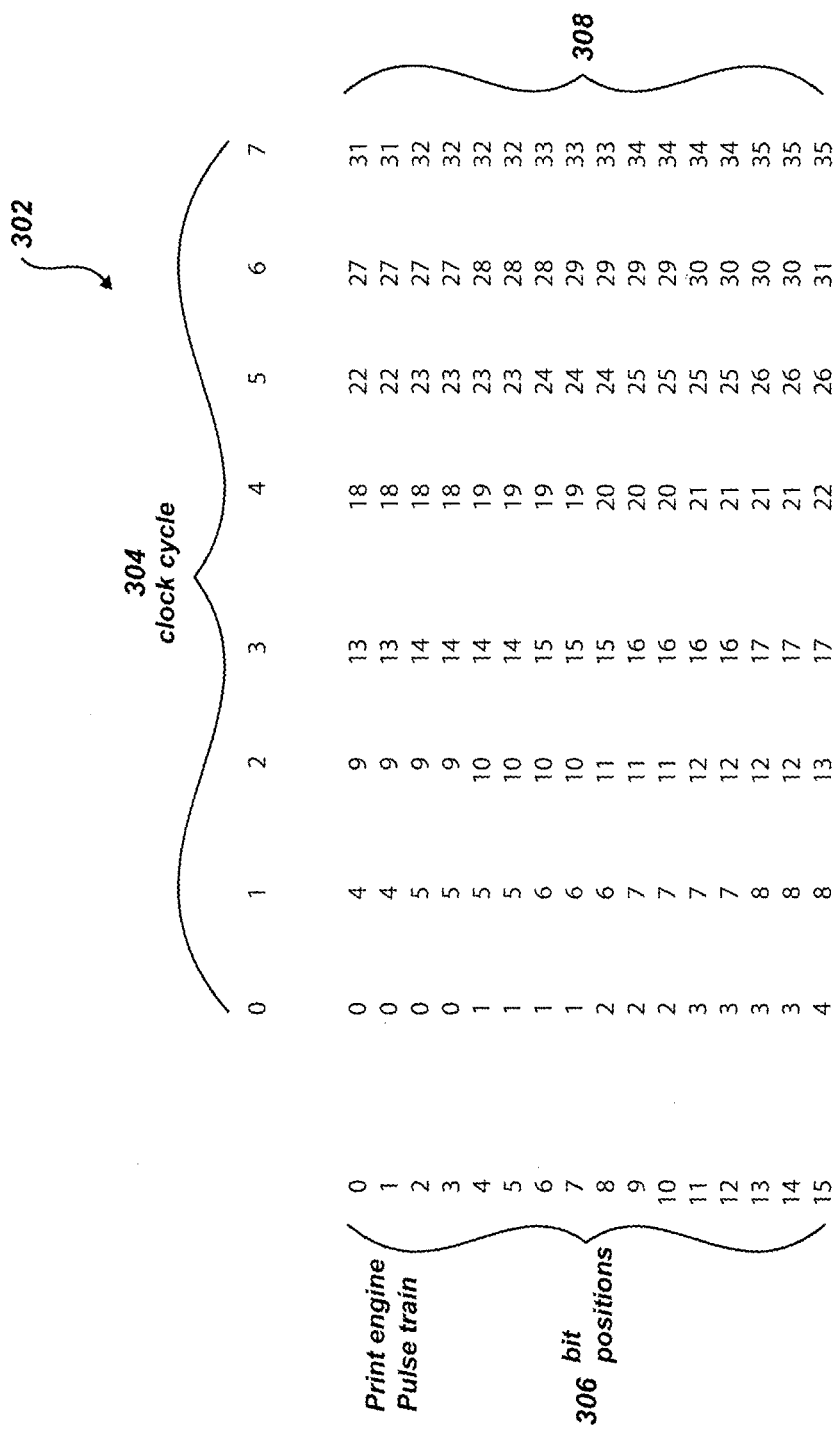
FIG. 3(*a*) shows an example of tap number data derived from the formulas in FIG. 2.

FIGS. 3(a) and 3(b) show an example of tap number data 300 and 302, respectively, for each bit position 306 in eight consecutive 16-bit print engine pulse trains. Eight clock cycles 304 of data are shown. The eight clock cycles 304 span a first 32-bit pixel pulse train and the beginning of a second 32-bit pixel pulse train. The data in FIG. 3(a) has been derived from Equation 1, the formulas of FIG. 2, and is based upon an image forming system 100 having:

b_ppp=32;
b_pept=16;
f_pe=22 MHz;
f_s=2.5 GHz; and therefore
I_S_V=4.5056

The decimal places in the tap numbers of FIG. 3(a) have been truncated to provide the tap integers in FIG. 3(b). FIG. 3(b) shows the relationship between the bits in the 16-bit print engine pulse train and the first and second 32-bit pixel pulse trains. For example, in the first clock cycle (clock cycle 0), bits 0 to 3 in the 16-bit print engine pulse train are assigned the status of bit 0 in the first 32-bit pixel pulse train.

The seventh clock cycle shows data bridging both 32-bit pixel pulse trains, where bits 2 to 15 are from the second 32-bit pixel pulse train. In the seventh clock cycle, bits 0 and 1 in the 16-bit print engine pulse train are assigned the status of bit 31 from the 32-bit pixel pulse train. For bit 2, the formula of FIG. 2 provides 32.1024. Because the truncated tap number is greater than the position number of the last bit in the first 32-bit pixel pulse train, bit 2 in the 16-bit print engine pulse train of the seventh cycle is assigned the status of bit 0 in the second 32-bit pixel pulse train. The remaining bits in the 16-bit print engine pulse train are assigned values from the second 32-bit pixel pulse train as indicated by the values in FIG. 3(b).

Figure 4:
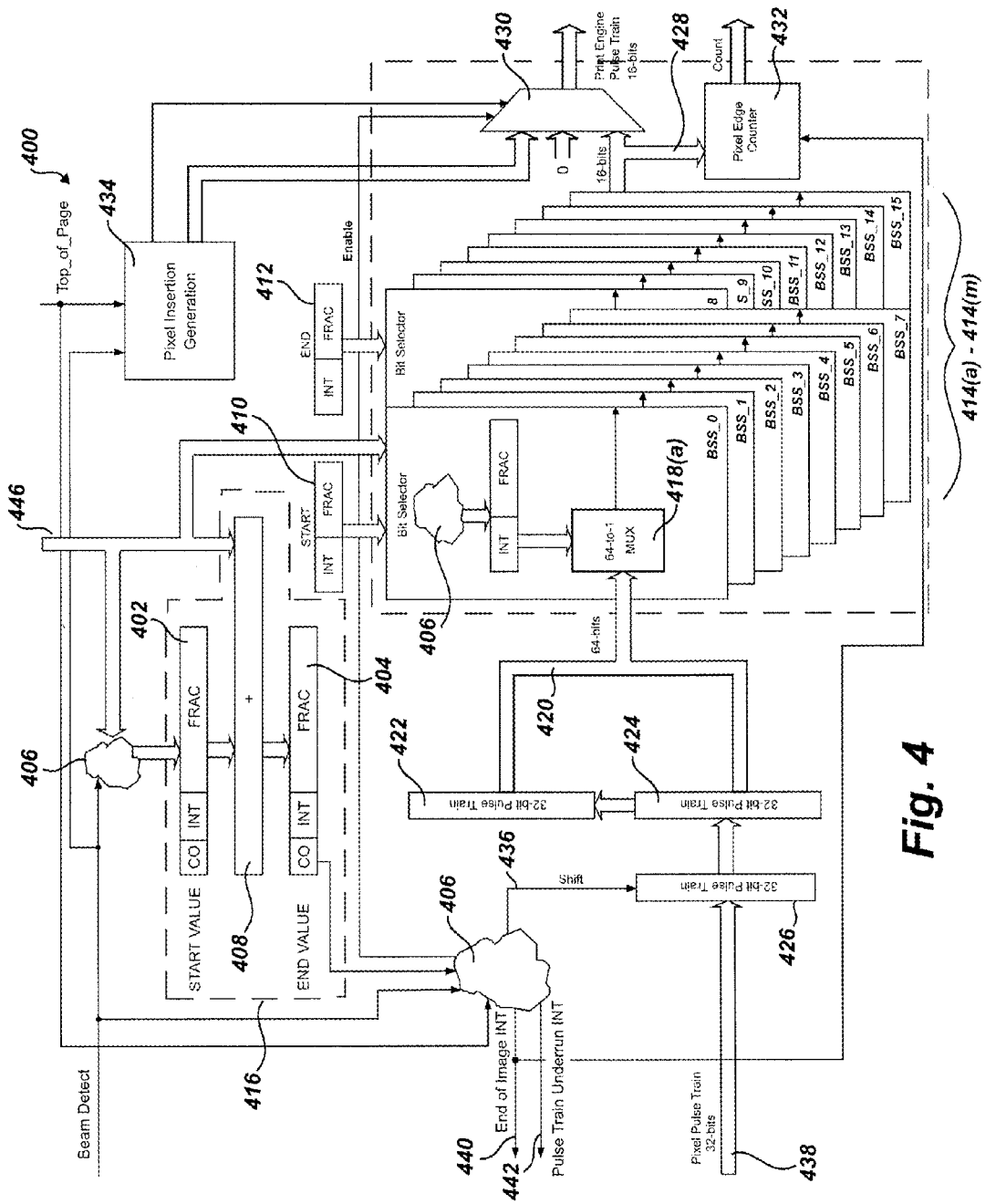
FIG. 4 is a circuit diagram of an image forming system implementing a version of a frequency synthesis technique of the invention.

FIG. 4 shows a circuit 400 having a version of a pacer and a version of an increment value processor. The circuit 400 has logic 406 that may be implemented by hardware or software (including firmware). The logic 406 communicates with an accumulator 416 having start and end value registers 402 and 404, and an adder 408. The logic 406 provides a start tap value and an increment value to the start value register 402 and the adder 408, respectively. The accumulator 416 is configured to provide an end tap value to an end value register 404 by adding the increment value to the start tap value.

The logic 406 receives the start tap value and the increment value from an increment value processor (such as increment value processor 112 of FIG. 2) through a bus 446. The increment value processor 112 may derive such values based upon information about the image forming system 100, such as the number of bits in the pixel pulse train, the number of bits in the print engine pulse train, the print engine frequency, and the serializer frequency. The increment value processor 112 may also provide one or more slope values to account for print engine frequency variations along a scan line. In one version, the increment value processor 112 has configuration registers to establish the increment value and slope value(s).

A second set of start and end value registers 410 and 412 hold the values that are held in the accumulator start and end value registers 402 and 404. The second set of start and end value registers 410 and 412 are in communication with sixteen bit selector circuits 414(a)-414(m). Each bit selector circuit 414(a)-414(m) includes a 64-to-1 multiplexer. Note that only the multiplexer 418(a) for bit selector circuit 414(a) is shown in FIG. 4, although each bit selector circuit 414(a)-414(m) has its respective multiplexer in the presently discussed embodiment.

Each 64-to-1 multiplexer is in communication with a 64-bit bus 420. The 64 bit bus 420 is in communication with primary and secondary 32-bit pixel pulse train registers 422 and 424, respectively. The primary 32-bit pixel pulse train register 422 temporarily stores a first 32-bit pixel pulse train. The secondary 32-bit pixel pulse train register 424 temporarily stores a second 32-bit pixel pulse train. The secondary 32-bit pixel pulse train register 424 is in communication with a buffer 32-bit pixel pulse train register 426 that temporarily stores a third 32-bit pixel pulse train. In one version, the 32-bit pixel pulse trains are received, under control of the logic 406, from a pixel pulse train generator through a 32-bit pixel pulse train bus 438.

The logic 406 controls the multiplexer (e.g., 418(a)) in each bit selector circuit 414(a)-414(m). Each bit selector circuit 414(a)-414(m) communicates one of the bits from the 64-bit bus 420 to a 16-bit print engine pulse train bus 428. The logic 406 is configured to select, for each bit selector circuit 414(a)-414(m), an input bit from the 64-to-1 multiplexer. In one version, the logic 406 is configured to select each bit based upon the data formulas 202 shown in FIG. 2.

The 16-bit print engine pulse train bus 428 communicates the output of each bit selector circuit 414(a)-414(m) to an output multiplexer 430 and a pixel edge counter 432. A pixel insertion generation circuit 434 controls the output multiplexer 430 to provide one of (a) the output from the bit selector circuits 414(a)-414(m), (b) only logic "0" to provide blank margin areas and the like, or, optionally, (c) special pixel data that is not image data. An example of special pixel data is printer identification data not detected by the eye on a sheet of paper. In addition, the pixel insertion generation circuit 434 is responsive to beam detect and top-of-page signals received from the print engine 110 for page alignment.

The logic 406 controls a shift signal 436 for triggering each 32-bit pixel pulse train register to receive its next 32-bit pixel pulse train. The logic 406 has as an input a carry-out (CO) signal from the end value register 404. The CO signal indicates whether the value in the end value register 404 is greater than or equal to 32. At the end of a clock cycle in which the value in the end value register 404 is greater than or equal to 32, the value in the secondary 32-bit pixel pulse train register 424 is written to the primary 32-bit pixel pulse train register 422, the value in the buffer 32-bit pixel pulse train register 426 is written to the secondary 32-bit pixel pulse train register 424, and the value of the next pixel from the 32-bit pixel pulse train input bus 438 is written to the buffer 32-bit pixel pulse train register 426.

The logic 406 may be configured to process status signals, including an End of Image INT signal 440 and a Pulse Train Underrun INT signal 442. The End of Image INT signal 440 indicates whether the final print engine pulse train for a page has been processed, and may be based upon a count of the number of carry-out signals received from the end value register 404. In an alternate version, end of image information is included in a pixel pulse train. The Pulse Train Underrun INT signal 442 indicates that the buffer 32-bit pixel pulse train register 426 is unable to provide a valid 32-bit pixel pulse train to the secondary 32-bit pixel pulse train register 424.

Referring again to FIG. 1, a sampler circuit 114 is shown in communication with the print engine 110 and the pacer 102 through a sync signal generator circuit 116. The sampler circuit 114 is configured to receive a start of line signal from the print engine 110 and generate a beam detect signal. The sampler circuit 114 communicates the beam detect signal to the sync signal generator circuit 116. The sync signal generator circuit 116 is configured to translate the timing of the beam detect signal from the higher frequency scale of the serializer 106 and sampler circuit 114 to the relatively lower frequency scale of the pacer 102. The sync signal generator circuit 116 synchronizes the beam detect signal to a pacer 102 clock signal plus an offset, which may be referred to as a PWM sync signal. By way of example, the sampler circuit 114 may be running at $f_1$ and the pacer 102 at a lower frequency $f_2$. For example, if $f_1=10 \times f_2$:

$$f_1: t_0\ t_1\ t_2\ t_3\ t_4\ t_5\ t_6\ t_7\ t_8\ t_9\ t_{10}$$

$$f_2: t_0 \hspace{6cm} t_1$$

If the sampler circuit 114 detects a start of line signal at $t_2$ ($f_1$), then the sync signal generator circuit 116 will generate a PWM sync signal=$t_0(f_2)$+offset, where the offset=$2/f_1$. The pacer 102 is configured to implement the offset value to synchronize generation of the first print engine pulse train to the start of a scan line. This allows for fine edge placement of the pixels with respect to the incoming start of line signal.

The image forming system 100 may include a built-in-self-test circuit (BIST) 118 in communication with the serializer 106 and the sampler circuit 114. In one version, BIST 118 is configured to output print engine pulse train test data to the serializer 106, and receive serialized test data from the sampler circuit 114. BIST 118 is configured to compare the output test data to the received test data to determine whether the serializer 106 is functioning properly at its operational frequency. In one version, the serializer 106 is tested at 2.5 GHz. BIST 118 is configured to provide test result signals to indicate whether the serializer 106 is functioning properly. The test result signals may also provide empirical data. The test result signals and empirical data may be provided by BIST 118 for detection at frequencies lower than the frequency of the serializer 106. In one version, the test result signals are provided at 22 MHz, which is easily received by a tester or signal reader.

The image forming system 100 may include a synthetic beam detect circuit 120 in communication with the sampler circuit 114. The synthetic beam detect circuit 120 is configured to generate a beam detect signal in the absence of a start of line signal from the print engine 110. The synthetic beam detect circuit 120 may be utilized to test the serializer 106 before it is physically connected to the print engine 110 or out of silicone.

Referring again to FIG. 4, the pixel edge counter 432 is implemented for accuracy verification purposes. The pixel edge counter 432 receives the 16 output bits from the 16-bit print engine pulse train bus 428 and detects and counts edges. Edges are detected as transitions in the print engine data. The logic 406 is configured to communicate the End of Image INT 440 to the pixel edge counter 432, at which time the edge count is locked and held. The edge count may be read by a tester or other device and compared with the number of edges in the source image to provide a measurement of accuracy.

The logic 406 may be implemented by software or hardware. In one version, the logic 406 is implemented by a field programmable gate array (FPGA) having multiple high speed serializer/deserializer (SERDES) blocks, such as the Virtex™-IIPro and Virtex™4-FX manufactured by Xilinx®, Inc. (San Jose, Calif.). In this version, the serializer 106 may be implemented by the SERDES blocks. In one of many alternate versions, the control logic may be implemented by a FPGA and the serializer 106 by an external SERDES standalone chip. In still other versions, the PWM may be prototyped in a FPGA to verify full speed operation, and then implemented by other logic circuitry.

Figure 5:
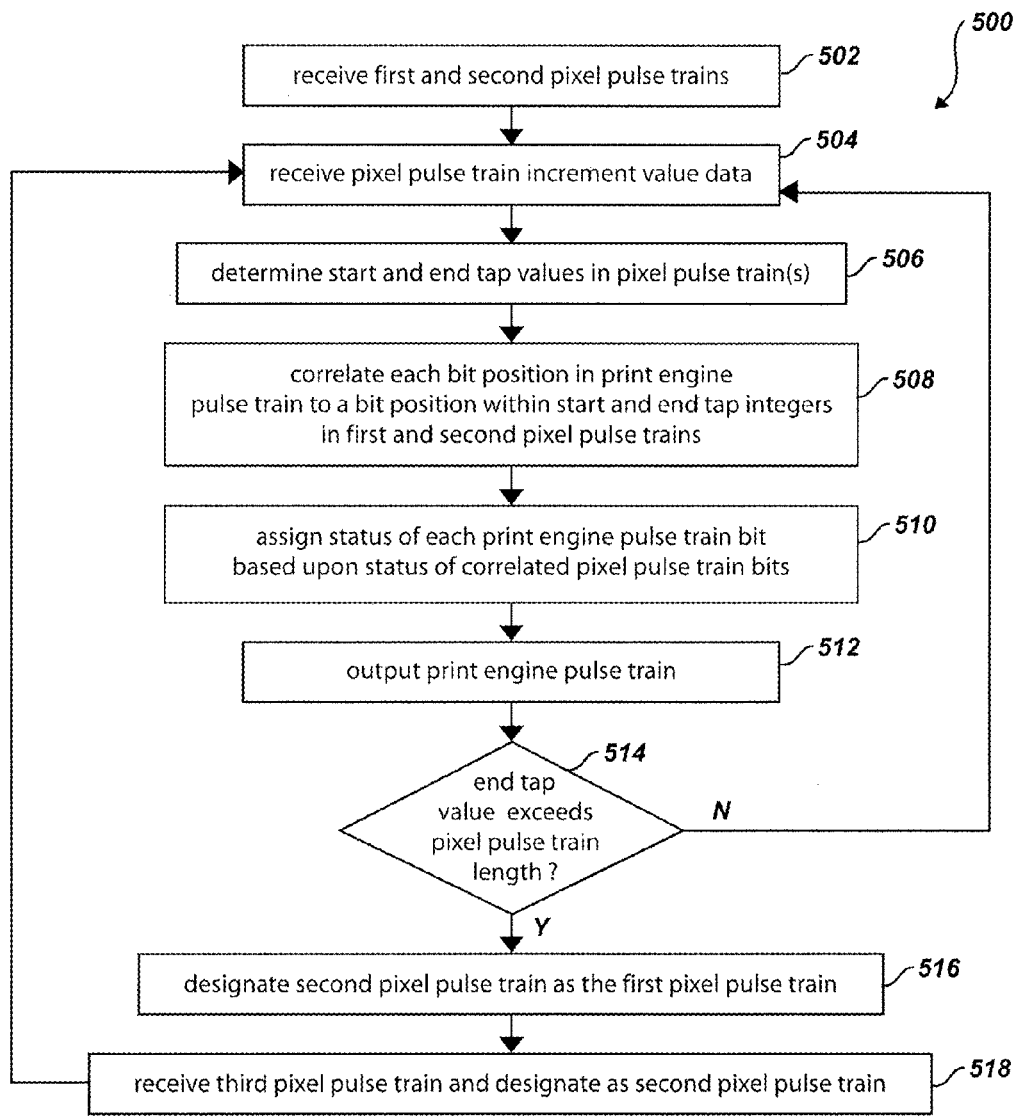
FIG. 5 shows acts for generating print engine data based upon pixel pulse train data in accord with the frequency synthesis technique of the invention.

Referring now to FIG. 5, Acts 500 are shown for generating a print engine pulse train based upon a pixel pulse train. First and second pixel pulse trains are received (Act 502). Both pixel pulse trains may have a fixed length. Examples of fixed length pixel pulse trains include 32-bit and 64-bit pulse trains. The pixel pulse trains may be based upon pixel data obtained from a video block, as an example.

Pixel pulse train increment value data is received (Act 504). Pixel pulse train increment value data may be an increment value for a pixel or clock cycle and/or data for determining an increment value for a pixel or a clock cycle. Increment value data may include the number of bits in a pixel pulse train, the number of bits in a print engine pulse train, a print engine frequency, and a serializer frequency. Examples of increment value data are referred to in Equation 1.

Start and end tap values in the pixel pulse train are determined (Act 506). The start and end tap values may be based upon the increment value data. In one version, the decimal places in the start and end tap values are truncated to provide start and end tap integers. In another version, the start and end tap values are rounded to the nearest integer to provide start and end tap integers. Other techniques for obtaining start and end tap integers are contemplated, including using equations and/or algorithms.

The print engine pulse train bit positions are correlated to start and end tap integers in the first and second pixel pulse trains (Act 508). The status of each print engine pulse train bit is assigned the status of the correlated pixel pulse train bit from the first and second pixel pulse trains (Act 510) and the print engine pulse train is output to a serializer (Act 512).

If the last tap number does not exceed the pixel pulse train length (Act 514, N), then Acts 504 to 514 are repeated. If the last tap number does exceed the pixel pulse train length (Act 514, Y), then the second pixel pulse train is designated the first pixel pulse train (Act 516) and a third pixel pulse train is received and designated the second pixel pulse train (Act 518). In one version, the acts shown in FIG. 5 are executed for additional pixel pulse trains and/or until further acts intervene, such as receiving an end of line, end of page, error, or other signal.

All of the discussion above, regardless of the particular implementation being described, is exemplary in nature, rather than limiting. For example, although selected aspects, features, or components of the implementations are depicted as hardware or software, all or part of the systems and methods consistent with the image forming system 100 may be stored on, distributed across, or read from machine-readable media, for example, secondary storage devices such as hard disks, floppy disks, and CD-ROMs; a signal received from a network; or other forms of ROM or RAM either currently known or later developed.

Furthermore, although specific components of the image forming system 100 are described, methods, systems, and articles of manufacture consistent with the system may include additional or different components. For example, the increment value processor 112, the pacer 102, the serializer 106 and/or the logic 406 may be implemented by one or more of: control logic, hardware, a microprocessor, microcontroller, application specific integrated circuit (ASIC), discrete logic, or a combination of circuits and/or logic. Any act or combination of acts may be stored as instructions in computer readable storage medium. Memories may be DRAM, SRAM, Flash or any other type of memory. Parameters, databases, tables, and other data structures, such as for implementing the increment step value, default value, and one or more slope values, may be separately stored and managed, may be incorporated into a single memory or database, or may be logically and physically organized in many different ways. Programs may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus comprising:
a pixel signal generator configured to generate a pixel signal;
an increment value processor configured to calculate increment value data to compensate for a pace of a beam moving along a scan line that is not in sync with a frequency of the pixel signal, wherein the increment value data is associated with a group of bits from the pixel signal and is calculated from at least one of a target print engine frequency and a serializer frequency; and
a print engine signal generator configured to generate a print engine signal by adjusting the group of bits from the pixel signal using the increment value data to compensate, at least in part, for the pace of the beam moving along the scan line.

2. The apparatus of claim 1, wherein the print engine signal generator is configured to generate a subset of the print engine signal by shrinking the group of bits from the pixel signal to a smaller group of bits.

3. The apparatus of claim 1, wherein the increment value data is further based upon a number of bits in the pixel signal and a number of bits in the print engine signal.

4. The apparatus of claim 1, further comprising a processor to generate a tap integer to identify a pixel signal bit to be used to compose at least two bits of the print engine signal.

5. The apparatus of claim 1, wherein the increment value processor is configured to calculate the increment value data based on both the target print engine frequency and the serializer frequency.

6. The apparatus of claim 1, further comprising:
a plurality of bit selector circuits; and
a processor configured to select for each bit selector circuit a respective input bit from the memory based upon a start tap value and an end tap value.

7. The apparatus of claim 6, further comprising at least one multiplexer in communication with the plurality of bit selector circuits to communicate selected input bits to a print engine signal bus.

8. The apparatus of claim 7, further comprising a pixel edge counter in communication with the print engine signal bus.

9. The apparatus of claim 7, further comprising a second memory operative to store a second pixel signal and in communication with the at least one multiplexer.

10. The apparatus of claim 1, further comprising:
a sampler to generate a beam detect signal; and
a sync generator in communication with the print engine signal generator configured to translate timing of the beam detect signal from the serializer frequency to a print engine signal generator frequency.

11. A method comprising:
generating a pixel signal;
calculating, by a hardware processor, increment value data configured to compensate for a varying pace of a beam moving along a scan line that is not in sync with a frequency of the pixel signal, wherein the increment value data is associated with a group of bits from the pixel signal and is calculated from at least one of a target print engine frequency and a serializer frequency; and
generating a print engine signal by adjusting the group of bits from the pixel signal based on the increment value data to compensate, at least in part, for the pace of the beam moving along the scan line.

12. The method of claim 11, further comprising generating a subset of the print engine signal by shrinking the group of bits from the pixel signal to a smaller group of bits.

13. The method of claim 11, wherein the increment value data is further based upon a number of bits in the pixel signal, or a number of bits in the print engine signal.

14. The method of claim 11, further comprising identifying a pixel signal bit to be used to compose at least two bits of the print engine signal.

15. The method of claim 11, further comprising serializing the print engine signal.

16. The method of claim 11, further comprising selecting a first input bit from the first pixel signal based upon a start tap value and an end tap value.

17. The method of claim 16, further comprising communicating the first input bit to a serializer.

18. The method of claim 17, further comprising communicating a second input bit from a second pixel signal to the serializer.

19. The method of claim 11, further comprising counting pixel edges in the print engine signal.

20. The method of claim 11, further comprising synchronizing the print engine signal to a beam detect signal.

* * * * *